March 22, 1966 E. T. CHILD ETAL 3,242,158
METHOD FOR PREPARING POLYISOBUTYLENE
Filed June 15, 1961
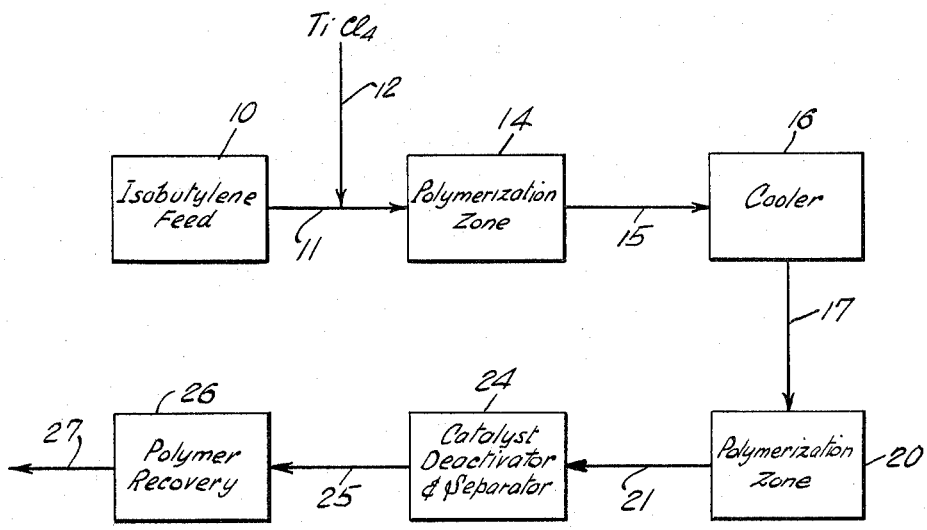
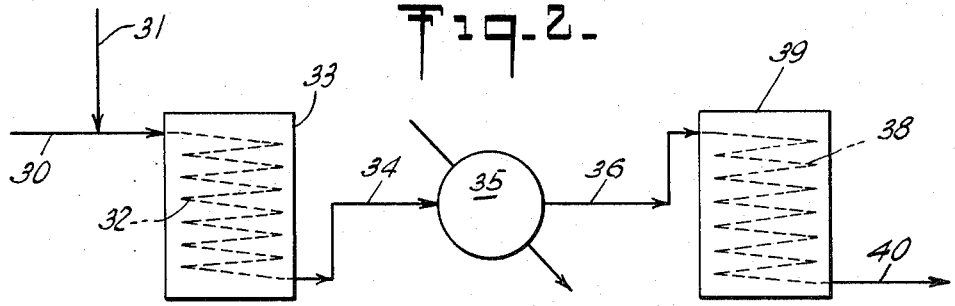

United States Patent Office 3,242,158
Patented Mar. 22, 1966

3,242,158
METHOD FOR PREPARING POLYISOBUTYLENE
Edward T. Child, Fishkill, N.Y., and George F. Pezdirtz, Newport News, Va., assignors to Texaco Inc., New York, N.Y., a corporation of Delaware
Filed June 15, 1961, Ser. No. 117,353
6 Claims. (Cl. 260—94.8)

This invention relates to polyisobutylene and, in particular, to an improved method for preparing polyisobutylene polymers having a number average molecular weight in the range of 850 to 1500.

Numerous methods are known for polymerizing isobutylene to polyisobutylene. The most widely used methods are those which employ Friedel-Crafts catalysts, such as aluminum trichloride, boron trifluoride and the like, alone or in admixture with promoters, or in the form of a complex catalyst. In general, the known processes comprise contacting isobutylene monomer with the catalyst in the presence of an inert diluent at a suitable temperature to effect the production of the polymer. On the whole, commercially adopted processes are quite complicated with respect to the catalyst compositions and processing steps employed and they do not represent the most desirable or efficient way for producing polyisobutylenes.

The polymerization of a olefin, such as isobutylene, is greatly affected by such factors as the temperature of polymerization and the concentration of the olefin monomer as well as by the catalyst, diluent, residence time, and other factors which enter into a polymerization reaction. In particular, a high polymerization temperature is more effective for promoting a high rate of polymerization but unfortunately leads to the production of progressively lower molecular weight polymer products. On the other hand, the use of a low polymerization temperature, while effective for producing relatively high molecular weight polymers, is relatively slow and uneconomical. Indeed, a low temperature polymerization process requires substantial cooling means to maintain the selected operating conditions because of the highly exothermic nature of the reaction.

An improved process for polymerizing isobutylene has now been discovered. This method is effective for producing polyisobutylenes having a number average molecular weight in the range from about 850 to 1500 characterized by having a relatively narrow range in the molecular weights of the individual polymer components. Another advantage of this process is that the polymerization reaction is conducted more efficiently than is possible by the known low temperature polymerization methods for producing polymers in the desired molecular weight range.

In accordance with this method, a feed stream or reaction mixture containing a high percentage of isobutylene is contacted with titanium tetrachloride in a first zone and maintained at a relatively high average temperature in the range of 150 to 200° F. to effect the polymerization of 60 to 80% of the isobutylene monomer in the reaction mixture. The temperature of the reaction mixture now containing a substantially lower amount of isobutylene monomer is quickly cooled 60 to 100° F. below the average polymerization temperature in the first zone and the polymerization reaction is continued while maintaining the aforesaid temperature differential until substantially all of the isobutylene has been polymerized.

The feed stream for this process consists of isobutylene monomer and an inert diluent. To obtain the advantages of this process, it is essential that the isobutylene content of the feed stream be in the range of 50 to 90% of the total feed stream, with the preferred proportions being from 75 to 90%. Feed streams containing less than 50% of isobutylene are too dilute to realize the advantages of this process.

A wide range of inert liquid diluents are suitable as components of the feed stream in this process. Paraffinic hydrocarbons that are liquid under ordinary conditions or are readily liquified are eminently suitable. Generally, aliphatic hydrocarbons having from 3 to 12 carbon atoms can be employed. Other inert diluents which can be employed include cycloaliphatic hydrocarbons, halogenated hydrocarbons and the like. The inert diluent constitutes the balance of the feed stream and may amount to 10 to 50% by weight thereof.

The only catalyst which is effective in this process is titanium tetrachloride. Liquid titanium tetrachloride is readily dissolved in and maintained in the isobutylene feed stream to initiate and sustain the polymerization reaction. This catalyst also has a low induction period which is essential for this type of operation. Difficultly soluble or insoluble Friedel-Crafts catalysts or those which are too reactive or have a high induction period or which require backmixing in the reactor, are not suitable.

The amount of titanium tetrachloride employed in this process is not critical. Generally, an amount in the range of 0.1 to 3% by weight based on the weight of the reaction mixture is effective. The preferred amount of catalyst to be employed is about 1%.

Liquid titanium tetrachloride may be introduced directly into the isobutylene feed stream. Alternatively, the titanium tetrachloride is admixed with a solvent and the mixture then introduced into the feed stream. The solvent may be the same as that employed in the isobutylene feed stream, as noted above or one that is compatible therewith. The catalyst mixture is preferably introduced into the isobutylene feed stream at a point adjacent to the place where the feed enters the first polymerization zone.

It is essential to conduct this reaction in a reactor that prevents any appreciable amount of backmixing of the reaction mixture containing the catalyst with the fresh feed entering the reactor. A substantial amount of backmixing will produce an undesirable drop in the molecular weight of the polymer produced as well as a drop in the conversion at constant residence time. For this reason, a continuously fed stirred tank-type of reactor is unsuitable for this process. Types of reactors that are suitable are elongated confined reaction vessels which do not permit backmixing. A particularly suitable type of reactor is a coil- or tube-type reactor wherein the reaction mixture flows or continuously passes through an elongated confined reaction zone or conduit. The acceptable reactors, moreover, readily lend themselves to effective temperature controls which is not possible with tank-type reactors.

This reaction is conducted in two reaction zones which are distinguished chiefly by the different polymerization temperatures employed therein. Different reactors may be employed for each of these zones separated by a heat exchanging means to provide for the lower reaction temperature in the second reaction zone or the reaction may be conducted in a single reactor wherein two separate polymerization zones are maintained each at the required operating temperatures. In any case, an elongated confined reactor, such as a tube or coil, is employed for both polymerization zones.

The first polymerization zone is maintained at a relatively high temperature in the range of 150 to 200° F.

Polymer formation at these temperatures with a high concentration of isobutylene is rapid. The isobutylene reaction mixture is maintained in this zone for sufficient time until 60 to 80% of the isobutylene in the reaction mixture has been converted or polymerized. The residence time in the first zone is in the range of 5 to 30 minutes.

The reaction mixture issuing from the first reaction zone is rapidly cooled to a temperature 60 to 100° F. below the average temperature employed in the first reaction zone. This 60 to 100° temperature differential in the second zone is maintained during the balance of the polymerization reaction. The cooling is essential to arrest or stop any further polymerization within the 150 to 200° F. range in the reaction mixture now containing a relatively low isobutylene content. If further polymerization is effected in the high temperature range, a relatively undesirable product would be produced characterized consisting of a very broad range of progressively lower molecular weight polymers.

The cooled reaction mixture is continuously passed through the second polymerization zone at a temperature 60 to 100° F. below the average temperature employed in the first polymerization zone for a period of time sufficient to effect substantially complete polymerization of the unreacted isobutylene monomer. The temperature in the second polymerization zone will be between 50 and 140° F. The residence time employed in this zone is in the range of 20 to 60 minutes. While completion of the polymerization reaction in this zone is conducted with a relatively low concentration of isobutylene monomer in the reaction mixture, nevertheless, the low temperature employed promotes the production of a relatively high molecular weight polyisobutylene polymer with a molecular weight generally corresponding to or in the range of the molecular weight of the polymer produced in the first polymerization zone. This two-step procedure achieves overall a high level of isobutylene polymerization generally amounting to at least 90% of the total isobutylene employed and at the same time results in the production of a valuable polymer product characterized by consisting of polymers falling within a relatively narrow molecular weight range.

The accompanying diagrams illustrate the manner of carrying out the present invention.

FIGURE 1 is a flow diagram showing the various steps employed for polymerizing isobutylene according to this process.

FIGURE 2 is a schematic diagram illustrating one mode of the practice of this invention.

Referring now to FIGURE 1, 10 is a reservoir provided with an isobutylene reaction mixture consisting of 50 to 90% of isobutylene monomer and the balance an inert diluent. The isobutylene feed stream is passed through line 11 into the first-stage polymerization zone 14. Titanium tetrachloride catalyst is introduced into the isobutylene feed stream 11 through line 12. Reactor 14 is a first-stage high-temperature reactor in which polymerization is effected at a temperature in the range of 150 to 200° F. After sufficient residence time in reactor 14 to effect polymerization of from 60 to 80% of the isobutylene in the feed stream, the reaction product is passed into cooler 16 via line 15.

Cooler unit 16 may be of any design so long as it quickly and effectively cools the reaction mixture to a temperature 60 to 100° F. below the average polymerization temperature employed in the first polymerization zone. This may be effected by passing the reaction mixture through a conventional heat exchanging means. The cooled reaction mixture is then passed into a second polymerization zone 20 through line 17.

It is contemplated that an alternative method for cooling the reaction mixture from the first reactor without employing a heat exchanging means may be employed. This is done by adding additional diluent to the reaction product mixture before the mixture enters the second polymerization zone. In this case, the added diluent is first cooled to such a low temperature that the temperature of the reaction mixture produced is in the desired temperature range.

The reaction mixture from the first zone, comprising 20 to 40% of unreacted isobutylene monomer based on the total amount of monomer initially present in the feed, is further polymerized at a temperature 60 to 100° F. below the temperature employed in the first polymerization zone. A sufficient residence time is provided within this polymerization zone as noted above to effect substantially complete polymerization of the unreacted isobutylene monomer.

The reaction product now containing substantially completely polymerized isobutylene is passed into catalyst deactivator unit 24 via line 21. The catalyst is deactivated therein with the aid of ammonia, water or other known catalyst deactivators and is separated from the reaction product. The catalyst-free reaction product is then passed into polymer recovery stage 26 via line 25 wherein the solvent and any other impurities are removed and the polymer recovered via line 27.

The schematic diagram, FIGURE 2, illustrates one mode of operation of this process. According to this mode of operation, the isobutylene feed stream is introduced into coil reactor 32 through line 30. Titanium tetrachloride or a mixture of same with an inert diluent is introduced into the feed stream through line 31. Jacket 33 surrounds reaction coil 32 and is a heat control means for maintaining the temperature in the coil reactor between 150 and 200° F. The residence time in the coil reactor in jacket 33 is so chosen that 60 to 80% of the isobutylene is polymerized in this reaction zone. The partially polymerized feed stream is then passed through a heat exchanger means 35 via line 34 wherein the temperature of the reaction mixture is rapidly cooled to a temperature 60 to 100° F. below the average temperature employed in reactor 32. The cooled feed stream is then passed to reactor 38 via line 36.

Coil reactor 38 is a second reaction zone enclosed within jacket 39. This jacket is a heat exchanging means for maintaining the lower temperature employed in reactor 38. The residence time in this reactor is sufficiently long to substantially completely polymerize the remaining isobutylene monomer in the reaction mixture. The completely reacted reaction product is recovered through line 40 and is subsequently treated to deactivate and remove the catalyst and to effect recovery of the polymer as described hereinabove.

The following example illustrates the practice of this invention.

EXAMPLE I

A feed stream consisting of 80% isobutylene and 20% of butane is continuously introduced into a coil reactor maintained at about 180° F. One percent by weight of titanium tetrachloride based on said isobutylene is introduced into said feed stream. The rate of feed is such that the residence time in this reactor is about 9 minutes. The partially reacted feed stream is then passed through heat exchanging means wherein the temperature of the feed stream is lowered about 69° F. This cooled feed stream is then passed through a second coil reactor maintained at a temperature of about 111° F. The residence time in this second reaction zone is about 39 minutes. After about 91 percent of the isobutylene reacts as indicated by an analysis of test samples taken from the coil reactor, the reaction product is passed into a catalyst deactivator and separator to remove the catalyst and thereafter into a fractionating tower to remove light components and effect recovery of the polymer. A polymer is produced having a number average molecular weight of 1332.

The advantages of this method for preparing polyisobutylene can be seen from the following table comparing the results of Example I with other typical reactions shown as Examples II through V.

Table
[Effect of conditions and reaction type]

| Example | Reactor Type | Conditions | $\overline{Mn}_i$ | $\overline{Mn}_F$ | Res. Time, Minutes | $\overline{Mn}$ |
|---|---|---|---|---|---|---|
| I—Stage 1 | No backmixing | 70% conversion, 180° F | 1,800 | 902 | 9 | 1,332 |
| I—Stage 2 | ----do---- | 21% conversion, 111° F | 1,800 | 902 | 39 | 1,332 |
| I—Overall | ----do---- | 91% conversion, 180° F. and 111° F. | 1,800 | 902 | 48 | 1,332 |
| II | ----do---- | 91% conversion, 180° F | 1,800 | 453 | 18 | 1,082 |
| III | ----do---- | 91% conversion, 160° F | 2,210 | 558 | 19 | 1,332 |
| IV | Complete backmixing | 91% conversion, 180° F | 453 | 453 | 72 | 453 |
| V | ----do---- | 91% conversion, 81° F | 1,332 | 1,332 | 492 | 1,332 |

All cases: (80 wt. percent isobutylene in—7.2 wt. percent isobutylene out) or 91 wt. percent conversion of isobutylene to polymer. All reactors are continuous flow reactors.

$\overline{Mn}_i$ = Number average molecular weight produced at beginning of reactor.

$\overline{Mn}_F$ = Number average molecular weight produced at end of reactor.

$\overline{Mn}$ = Overall (integrated) number average molecular weight produced by the entire reactor. In other words, the molecular weight of the product polymer.

Obviously, many modifications and variations of the invention, as hereinbefore set forth, may be made without departing from the spirit and scope thereof, and therefore only such limitations should be imposed as are indicated in the appended claims.

We claim:

1. A method for producing polyisobutylene which comprises contacting a reaction mixture containing at least 50% of isobutylene with titanium tetrachloride in a coil reactor at a temperature in the range of 150 to 200° F. in a first polymerization zone until 60 to 80% of said isobutylene has polymerized, cooling said isobutylene reaction mixture to a temperature 60 to 100° F. below the temperature employed in said first zone and further polymerizing said reaction mixture in a second zone in said reactor while maintaining said lower temperature until substantially all of said isobutylene has been polymerized.

2. A method for producing polyisobutylene having a number average molecular weight in the range of 850 to 1500 which comprises contacting a reaction mixture consisting of 50 to 90% of isobutylene and an inert diluent with titanium tetrachloride in a coil reactor at a temperature in the range of 150 to 200° F. in a first polymerization zone until 60 to 80% of said isobutylene has polymerized, cooling said isobutylene feed stream to a temperature 60 to 100° F. below the temperature in said first zone and further polymerizing said reaction mixture in a second zone in said reactor while maintaining said lower temperature until substantially all of said isobutylene has been polymerized.

3. A method for producing polyisobutylene having a number average molecular weight in the range of 850 to 1500 which comprises contacting a reaction mixture, consisting of 50 to 90% of isobutylene and an inert diluent, with 0.1 to 3 weight percent based on said reaction mixture of titanium tetrachloride at a temperature in the range of 150 to 200° F. in a coil reactor until 60 to 80% of said isobutylene has polymerized, cooling said isobutylene feed stream to a temperature 60 to 100° F. below the temperature in said first zone and further polymerizing said reaction mixture in a second zone in said reactor which prevents backmixing while maintaining said lower temperature until substantially all of said isobutylene has polymerized.

4. A process according to claim 3 in which the residence time in said first polymerization zone is from 5 to 30 minutes and the residence time in said second polymerization zone is from 20 to 60 minutes.

5. A method for producing polyisobutylene having a number average molecular weight in the range of 850 to 1500 which comprises contacting a reaction mixture, consisting of 50 to 90% by weight of isobutylene and an inert diluent, with 0.1 to 3% by weight based on said mixture of titanium tetrachloride in a coil reactor at a temperature in the range of 150 to 200° F. for a residence time from about 5 to 30 minutes until 60 to 80% of said isobutylene has polymerized, cooling said reaction mixture to a temperature 60 to 100° F. below the temperature in said first zone and further polymerizing said reaction mixture in a second zone in said reactor while maintaining said lower temperature for a residence time in the range of 20 to 60 minutes until a total of at least 90% of said isobutylene has polymerized to polyisobutylene.

6. A process according to claim 5 in which added super-cooled diluent is employed to cool the reaction mixture from said first polymerization zone.

References Cited by the Examiner

UNITED STATES PATENTS

| | | | |
|---|---|---|---|
| 2,125,872 | 8/1938 | Arveson | 260—94.8 |
| 2,126,001 | 8/1938 | Fulton et al. | 260—94.8 |
| 2,131,196 | 9/1938 | Schneider | 260—94.8 |
| 2,139,038 | 12/1938 | Russell | 260—94.8 |
| 2,964,514 | 12/1960 | Fawcett | 260—94.9 |

OTHER REFERENCES

"Vinyl and Related Polymers" (Schildknecht), published by John Wiley and Sons (New York), 1952.

JOSEPH L. SCHOFER, *Primary Examiner.*

MARK LIEBERMAN, LEON J. BERCOVITZ,
*Examiners.*